(12) United States Patent
Kalhan

(10) Patent No.: US 10,412,706 B2
(45) Date of Patent: Sep. 10, 2019

(54) ESTABLISHING DATA RELAY OPERATION BETWEEN A RELAY USER EQUIPMENT (RELAY-UE) DEVICE AND AN OUT-OF-COVERAGE USER EQUIPMENT (UE) DEVICE

(71) Applicants: Kyocera Corporation, Kyoto (JP); Amit Kalhan, San Diego, CA (US)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/572,737

(22) PCT Filed: May 13, 2016

(86) PCT No.: PCT/US2016/032312
§ 371 (c)(1),
(2) Date: Nov. 8, 2017

(87) PCT Pub. No.: WO2016/186995
PCT Pub. Date: Nov. 24, 2016

(65) Prior Publication Data
US 2018/0152915 A1 May 31, 2018

Related U.S. Application Data

(60) Provisional application No. 62/162,220, filed on May 15, 2015.

(51) Int. Cl.
*H04W 72/02* (2009.01)
*H04W 72/04* (2009.01)
(Continued)

(52) U.S. Cl.
CPC .......... *H04W 72/02* (2013.01); *H04W 72/04* (2013.01); *H04W 84/04* (2013.01); *H04W 88/04* (2013.01)

(58) Field of Classification Search
CPC ..... H04W 72/02; H04W 72/04; H04W 84/04; H04W 88/04
(Continued)

(56) References Cited

U.S. PATENT DOCUMENTS 9,769,862 B2\* 9/2017 Sheng ..................... H04W 4/70
2013/0304631 A1\* 11/2013 Wang ..................... G06Q 20/12
705/39

(Continued)

OTHER PUBLICATIONS

NEC; "On necessary L1 enhancements for UE-to-Network Relay"; R1-151564; 3GPP TSG RAN WG1 Meeting #80bis; Belgrade, Serbia; Apr. 10, 2015.
(Continued)

*Primary Examiner* — Tan H Trinh

(57) ABSTRACT

An in-coverage (InC) relay user equipment (Relay-UE) device selects a resource allocation from a communication resource pool or receives the selected resource allocation from an eNB, and then transmits the selected resource allocation to one or more out-of-coverage (OoC) UE devices. The resource allocation is for a device-to-device (D2D) communication link between the InC Relay-UE device and the OoC UE devices. After receiving the resource allocation, an OoC UE device may relay data to a base station (eNB) by way of the InC Relay-UE, using the allocated transmission resources.

20 Claims, 7 Drawing Sheets

(51) Int. Cl.
*H04W 88/04* (2009.01)
*H04W 84/04* (2009.01)

(58) Field of Classification Search
USPC ..... 455/41.1, 41.2, 426, 426.1, 450, 11.1, 7, 455/13.1, 67.11; 370/329, 312, 336
See application file for complete search history.

(56) References Cited

U.S. PATENT DOCUMENTS

| | | | | |
|---|---|---|---|---|
| 2014/0328329 A1* | 11/2014 | Novlan | ............... | H04W 72/042 370/336 |
| 2015/0045018 A1* | 2/2015 | Liu | ............... | H04L 1/00 455/426.1 |
| 2015/0092706 A1* | 4/2015 | Chen | ............... | H04W 74/02 370/329 |
| 2015/0208332 A1* | 7/2015 | Baghel | ............... | H04W 48/16 370/255 |
| 2015/0208384 A1* | 7/2015 | Baghel | ............... | H04W 72/04 455/450 |
| 2015/0245334 A1* | 8/2015 | Chang | ............... | H04W 76/14 370/329 |
| 2015/0264677 A1* | 9/2015 | He | ............... | H04W 72/02 370/312 |
| 2015/0271675 A1* | 9/2015 | Cheng | ............... | H04W 8/005 455/410 |
| 2015/0327315 A1* | 11/2015 | Xue | ............... | H04L 5/0044 370/330 |
| 2015/0334760 A1* | 11/2015 | Sartori | ............... | H04W 76/10 370/329 |
| 2016/0242144 A1* | 8/2016 | Adachi | ............... | H04W 76/14 |
| 2016/0295565 A1* | 10/2016 | Kim | ............... | H04W 76/14 |
| 2016/0302250 A1* | 10/2016 | Sheng | ............... | H04W 4/70 |
| 2016/0338094 A1* | 11/2016 | Faurie | ............... | H04W 72/085 |
| 2016/0338095 A1* | 11/2016 | Faurie | ............... | H04W 28/0278 |
| 2016/0345307 A1* | 11/2016 | Huang | ............... | H04W 52/0216 |
| 2016/0374105 A1* | 12/2016 | Kalhan | ............... | H04W 72/1278 |
| 2017/0048822 A1* | 2/2017 | Lee | ............... | H04W 72/04 |
| 2017/0094709 A1* | 3/2017 | Wang | ............... | H04W 76/043 |
| 2017/0126306 A1* | 5/2017 | Kim | ............... | H04W 76/14 |
| 2017/0230941 A1* | 8/2017 | Agiwal | ............... | H04W 72/04 |
| 2017/0238282 A1* | 8/2017 | Wei | ............... | H04W 72/042 370/329 |
| 2017/0244469 A1* | 8/2017 | Seo | ............... | H04W 68/02 |
| 2017/0251486 A1* | 8/2017 | Hu | ............... | H04W 72/1242 |
| 2017/0303240 A1* | 10/2017 | Basu Mallick | ............... | H04W 72/04 |
| 2017/0303291 A1* | 10/2017 | Chae | ............... | H04W 72/04 |
| 2017/0318551 A1* | 11/2017 | Yasukawa | ............... | H04W 92/18 |
| 2017/0325243 A1* | 11/2017 | Yasukawa | ............... | H04W 48/08 |
| 2017/0366919 A1* | 12/2017 | Lim | ............... | H04W 72/12 |
| 2018/0027475 A1* | 1/2018 | Li | ............... | H04W 8/24 455/426.1 |
| 2018/0069664 A1* | 3/2018 | Khoryaev | ............... | H04L 1/1621 |
| 2018/0092019 A1* | 3/2018 | Yasukawa | ............... | H04W 88/04 |
| 2018/0110037 A1* | 4/2018 | Yasukawa | ............... | H04W 76/14 |
| 2018/0132202 A1* | 5/2018 | Kalhan | ............... | H04W 8/005 |
| 2018/0139724 A1* | 5/2018 | Loehr | ............... | H04W 72/02 |
| 2018/0146494 A1* | 5/2018 | Khoryaev | ............... | H04W 76/14 |
| 2018/0167820 A1* | 6/2018 | Belleschi | ............... | H04W 72/02 |
| 2018/0206260 A1* | 7/2018 | Khoryaev | ............... | H04W 72/1242 |
| 2018/0242393 A1* | 8/2018 | Wei | ............... | H04W 88/04 |

OTHER PUBLICATIONS

NTT Docomo; "Resource Allocation for UE-to-Network Relay"; R1-151964; 3GPP TSG RAN WG1 Meeting #80bis; Belgrade, Serbia; Apr. 11, 2015.

Huawei, Hisilicon; "Resource allocation for UE-to-Network relay"; R1-151279; 3GPP TSG RAN WG1 Meeting #80bis; Belgrade, Serbia; Apr. 10, 2015.

* cited by examiner

ESTABLISHING DATA RELAY OPERATION BETWEEN A RELAY USER EQUIPMENT (RELAY-UE) DEVICE AND AN OUT-OF-COVERAGE USER EQUIPMENT (UE) DEVICE

CLAIM OF PRIORITY

The present application claims priority to Provisional Application No. 62/162,220 entitled "UE-to-Network Relaying Operation", filed May 15, 2015, assigned to the assignee hereof and hereby expressly incorporated by reference in its entirety.

FIELD

This disclosure generally relates to wireless communications, and more particularly, to data relay operations that rely on (device-to-device) D2D communication links between user equipment (UE) devices in a cellular communication system.

BACKGROUND

Many wireless communication systems use eNBs (base stations, eNodeBs, eNBs) to provide geographical service areas where wireless communication user equipment (UE) devices communicate with the eNB providing the particular geographical service area in which the UE devices are located. The eNBs are connected within a network allowing communication links to be made between the wireless communication devices and other devices. In some circumstances, the communication links are between wireless communication UE devices that are close to each other. In these situations, it may be preferred to have a direct communication link between the two wireless UE devices rather than communicating through a base station. Such direct communication between devices is often referred to as device-to-device (D2D) communication or peer-to-peer (P2P) communication. The communication resources (e.g., time-frequency blocks) used for D2D communication are typically a subset of the communication resources used by the communication system for communication between UE devices and the eNBs.

An in-coverage UE device (InC UE device) is a UE device that is within the service area of an eNB and is capable of communication with the eNB. An out-of-coverage UE device (OoC UE device) or remote-UE device is typically a UE device that is not within a service area of any eNB, but may include some OoC UE devices that can receive a downlink from the eNB but cannot reach the eNB with on an uplink (even though they may be in the service area). D2D UE devices that are engaged in D2D communication with each other form a D2D group. A D2D group, therefore, includes two or more D2D UE devices. There are several coverage scenarios that may occur with D2D groups. In an InC coverage scenario, all the UE devices of the D2D group are located in a service area of a single eNB. For the InC scenario, therefore, all of the D2D UE devices of the D2D group are InC UE devices in a single service area. In an OoC coverage scenario, none of the UE devices of the D2D group are located inside any service area of any eNB. For such a scenario, therefore, all of the D2D UE devices of the D2D group are OoC UE devices. In a partial coverage scenario, at least one of the UE devices of the D2D group is located in a service area of a single eNB and at least one D2D UE device of the group is outside all service areas. For the partial coverage scenario, therefore, at least one of the D2D UE devices of the D2D group is an InC UE device in a single service area and at least one UE device is an OoC UE device. Other coverage scenarios are possible.

In some scenarios, an InC UE device may act as a relay UE device (Relay-UE) for relaying data between and eNB and a remote OoC UE device or InC UE device by way of a D2D communication link.

SUMMARY

This disclosure addresses certain improved procedures for allocating communication resources for relaying data from an eNB to a Remote-UE device, and from the Remote-UE device to the eNB, via a Relay-UE device that acts as a middleman.

More specifically, an in-coverage (InC) relay user equipment (Relay-UE) device selects a resource allocation from a communication resource pool or receives the selected resource allocation from an eNB, and then transmits the selected resource allocation to one or more out-of-coverage (OoC) UE devices. The relay-UE device may independently choose the resources, or the eNB may ask the relay-UE to choose certain specific resources. The resource allocation identifies one or more communication resources that may be used for a device-to-device (D2D) communication link between the InC Relay-UE device and the OoC UE devices. Upon receiving the resource allocation, an OoC UE device may relay data to a base station (eNB) by way of the InC Relay-UE, using the allocated communication resources.

BRIEF DESCRIPTION OF THE DRAWINGS

It is to be understood that the drawings are solely for purpose of illustration and do not define the limits of what is claimed. Furthermore, the components in the figures are not necessarily to scale. In the figures, like reference numerals designate corresponding parts throughout the different views.

DETAILED DESCRIPTION

The following detailed description, which references to and incorporates the drawings, describes and illustrates one or more specific embodiments of systems and methods incorporating what is claimed. These embodiments, offered not to limit but only to exemplify and teach the methods and systems, are shown and described in sufficient detail to enable those skilled in the art to practice the techniques. Thus, where appropriate to avoid obscuring the systems and methods, the description may omit certain information known to those of skill in the art. The embodiments disclosed herein are examples that should not be read to unduly limit the scope of any claims.

The word "exemplary" is used throughout this disclosure to mean "serving as an example, instance, or illustration." Any embodiment or feature described herein as "exemplary" is not necessarily to be construed as preferred or advantageous over other embodiments or features.

Figure 1:
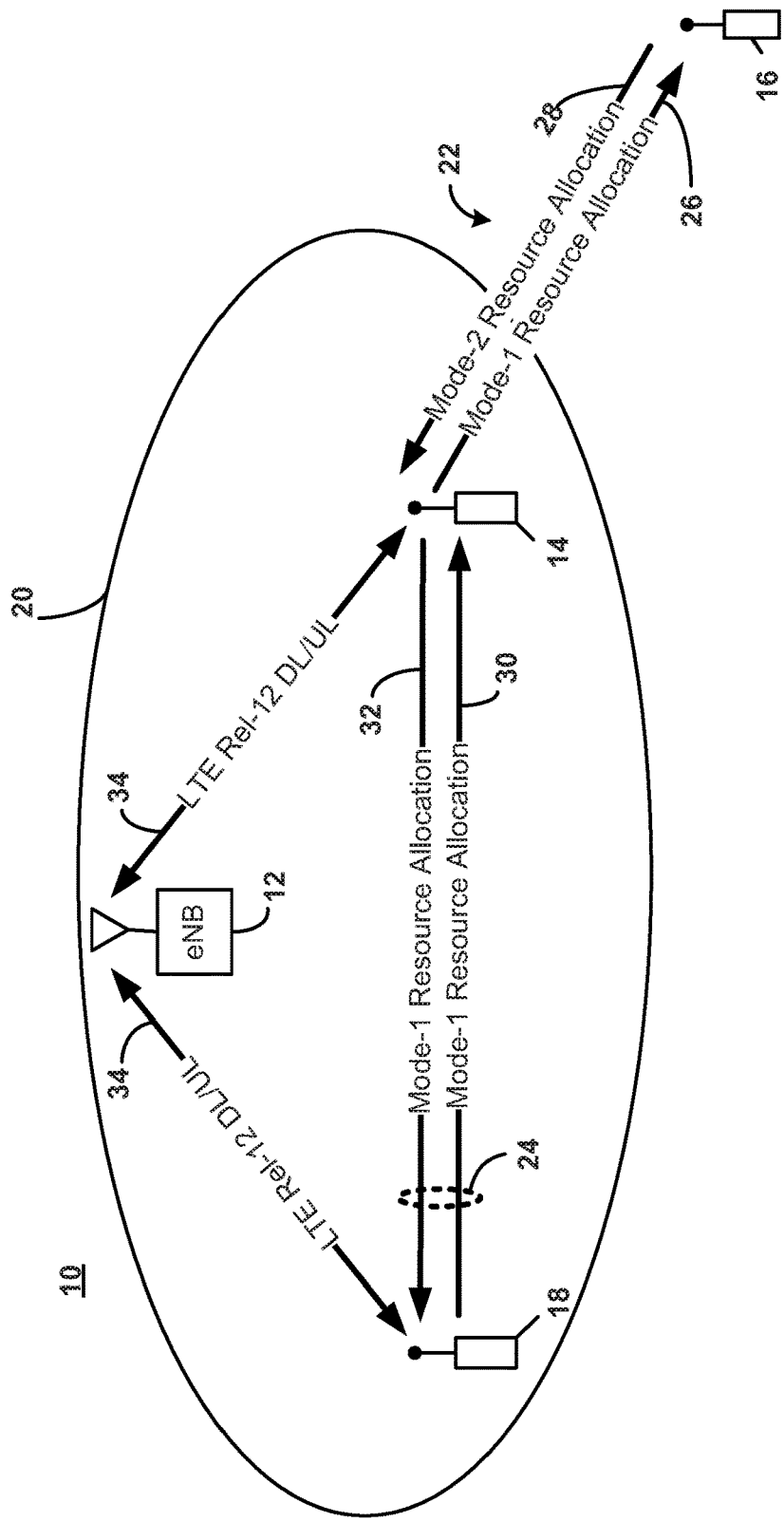
FIG. 1 is a conceptual block diagram of an exemplary cellular communication system that supports data relay operations between a base station (eNB), a relay user equipment (Relay-UE) device, and one or more remote user equipment (UE) devices.

FIG. 1 is an illustration of an exemplary cellular communication system 10 where macrocell communication resources are used for device-to device (D2D) communication. The communication system 10 supports data relay operations between an eNB (base station, eNodeB) 12, a relay user equipment (Relay-UE) device 14, and one or more remote user equipment (UE) devices 16, 18. An in-coverage (InC) remote UE device 18 and out-of-coverage (OoC) UE device 16 are shown. Although only two remote UE devices 16, 18 are shown in FIG. 1, additional remote UE devices can be present in the system 10 and may form one or more remote UE groups.

The eNB 12 provides wireless communication services to wireless communication UE devices 14, 16 within a geographical service area 20, sometimes referred to as a cell. Several eNBs are typically interconnected through a backhaul (not shown) to provide several service areas to cover large areas. The various functions, methods, and operations described herein with reference to the communication system 10 may be implemented in any number of devices, circuits, or elements. Two or more of the functions may be integrated in a single device and the functions described as performed in any single device may be implemented over several devices. For example, at least some of the functions of the Relay-UE device 14 may be performed by the eNB 12, in some circumstances, and vice versa.

A cellular communication system is typically required to adhere to a communication standard or specification. The Third-Generation Partnership Project Long-Term Evolution (3GPP LTE) communication specification is a specification for systems where base stations (eNodeBs, eNBs) provide service to wireless communication devices (UE devices) using orthogonal frequency-division multiple access (OFDMA) on the downlink and single-carrier frequency-division multiple access (SC-FDMA) on the uplink. Although the techniques described herein may be applied in other types of communication systems, the exemplary system discussed herein generally operates in accordance with a 3GPP LTE communication specification.

The eNB 102 is a fixed transceiver station, sometimes referred to as a base station, an evolved Node B or eNodeB, which may include a controller in some circumstances. Alternatively, the eNB 102 may be connected to a controller (not shown) within a network through a backhaul, which may include any combination of wired, optical, and/or wireless communication channels. For the examples herein, the controller includes the functionality of the Mobility Management Entity (MME) and the Packet Gateway (P-GW). Accordingly, the controller includes a scheduler. In the example, the scheduler allocates time-frequency resources for communication between the wireless communication devices 14, 18, as well as between the base station 12 and the wireless communication devices 14, 18. The OoC UE communication device 16, which is outside of the geographic service area 20, is capable of receiving wireless service from the eNB 12 when the device 16 is within the service area 20. Since the device 16, however, is out of range of the eNB 12, it cannot receive services or data directly from the eNB 12.

The UE devices 14, 16, 18 may be referred to as mobile devices, wireless devices, wireless communication devices, and mobile wireless devices, UEs, and UE devices, as well as by other terms. The UE devices 14, 16, 18 include electronics and software/firmware code for communicating with base stations and with other wireless communication devices in device-to-device (D2D) configurations. The wireless communication devices include devices such as cell phones, smart phones, personal digital assistants (PDAs), wireless modem cards, wireless modems, televisions with wireless communication electronics, and laptop and desktop computers as well as other devices. The combination of wireless communication electronics with an electronic device, therefore, may form a UE device 14, 16, 18. For example, a UE device 14, 16, 18 may include a wireless modem connected to an appliance, computer, television, gaming console, or other device.

The eNB 12 includes a wireless transceiver that can exchange wireless signals with the UE devices 14, 18 within the service area 20. Transmissions 34 from the base stations, including eNB 12, and from the UE devices 14, 18 are governed by a communication specification that defines signaling, protocols, and parameters of the transmission. The communication specification may provide strict rules for communication and may also provide general requirements where specific implementations may vary while still adhering to the communication specification. Although the discussion herein is directed to the 3GPP Long Term Evolution (LTE) communication specification, other communication specifications may be used in some circumstances. The communication specification defines at least a data channel and a control channel for uplink (UL) and downlink (DL) transmissions and specifies at least some timing and frequency parameters for physical downlink control channels from a base station to a UE device 14, 18. System timing information provided to the UE devices allows for synchronization of communication.

As discussed above, in some situations, two or more UE devices may communicate directly with each other without communication through a base station. Such device-to-device (D2D) communication may occur between UE devices within the service area of a base station, or outside the service area. For the example discussed herein, the in-coverage InC UE devices 14, 18 may form a first D2D group that is within the service area 20, and they may communicate with each other using a D2D communication using an InC D2D link 24, which has an UL 30 and a DL 32. Out-of-Coverage (OoC) UE device 16 may be part of a second D2D group outside of the service area 20, and may communicate with other group member UE devices using D2D communication. In a partial coverage scenario, at least one of the D2D UE devices (e.g., Relay-UE device 14) of the D2D group is located in a service area of a single eNB and at least one D2D UE device of the group (e.g., OoC UE device 16) is outside all service areas. In a partial coverage scenario, therefore, at least one of the D2D UE devices of the D2D group is an InC UE device in a single service area and at least one UE device is an OoC UE device. The partial coverage D2D group in FIGS. 1-2 includes the Relay-UE device 14 and the remote OoC UE device 16. The D2D communication link 22 between the Relay-UE device 14 and the OoC UE device includes a DL 26 and a UL 28.

The D2D relay procedures and operations described herein are advantageous because they may reuse many of the LTE standard Release 12 (Rel-12) D2D procedures. For example, the LTE Rel-12 D2D resource allocation for downstream (downlink) data relaying from the Relay-UE device 14 to the Remote-UE devices 16, 18 may be reused in the examples disclosed herein. Additionally, in some circumstances, the LTE Rel-12 D2D Mode 2 resource allocation for upstream (uplink) data relaying from the OoC Remote-UE device 16 to the Relay-UE device 14 may be used. On top of the system 10 reusing some standardized methods for relaying data, the Relay-UE device 14 can be configured to select and allocate communication path resources for the upstream D2D link 28 between the Relay-UE device 14 and the OoC UE device 16. For example, the Relay-UE device 14 may allocate subset(s) of the configured resource pools to the Remote-UE device 16.

Figure 2:
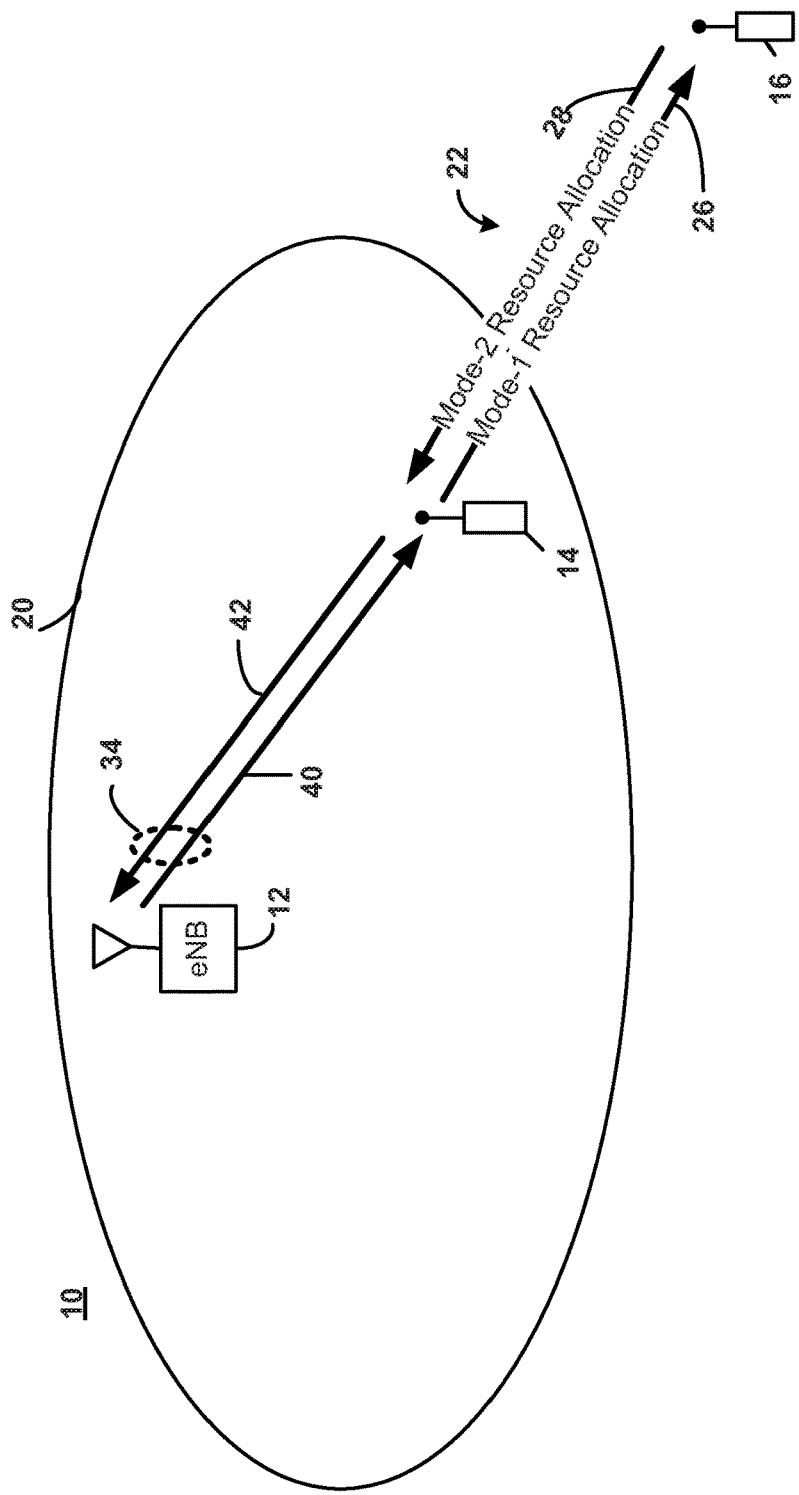
FIG. 2 is a conceptual block diagram of the cellular communication system of FIG. 1 showing additional details of the relay operation involving the out-of-coverage UE device.

FIG. 2 is a conceptual block diagram of the cellular communication system 10 showing additional details of a relay operation involving the OoC UE device 16, the Relay-UE device 16, and the eNB 12. This figure shows the uplink 42 and downlink 40 of the Rel-12 LTE communication link 40 between the eNB 12 and the Relay-UE device 14. FIG. 2 also shows the Relay-UE device 14 forwards data from the eNB 12 to the Remote OoC UE device 16 on the downstream path 26. Similarly, the data path 28, 42 from the Remote UE device 16 to the eNB 12 via the Relay-UE device 14 is referred to as upstream path. There are two links that need to be considered to support UE-to-Network Relays: one is the link 22 between the Remote OoC UE device 16 and the Relay-UE, and the other is the link 34 between the Relay-UE device 14 and the eNB 12.

Another scenario, shown in FIG. 1 but not FIG. 2, is where a remote-UE 18 is located within the eNB coverage area 20. D2D links similar to those discussed above for the OoC UE device 16 may also apply to the InC Remote-UE 18 scenario, as is discussed below.

Communication between the Relay-UE device 14 and the eNB 12 of FIGS. 1 and 2 may use the LTE standard Rel-12 cellular DL/UL procedures. The new approaches disclosed herein focus on the data communication procedure between the Relay-UE device 14 and the remote OoC UE device 16. As discussed above, the D2D communication link between the Relay-UE device 14 and remote UE device 16 is considered from downstream and upstream perspectives. First, the downstream is considered.

Figure 3:
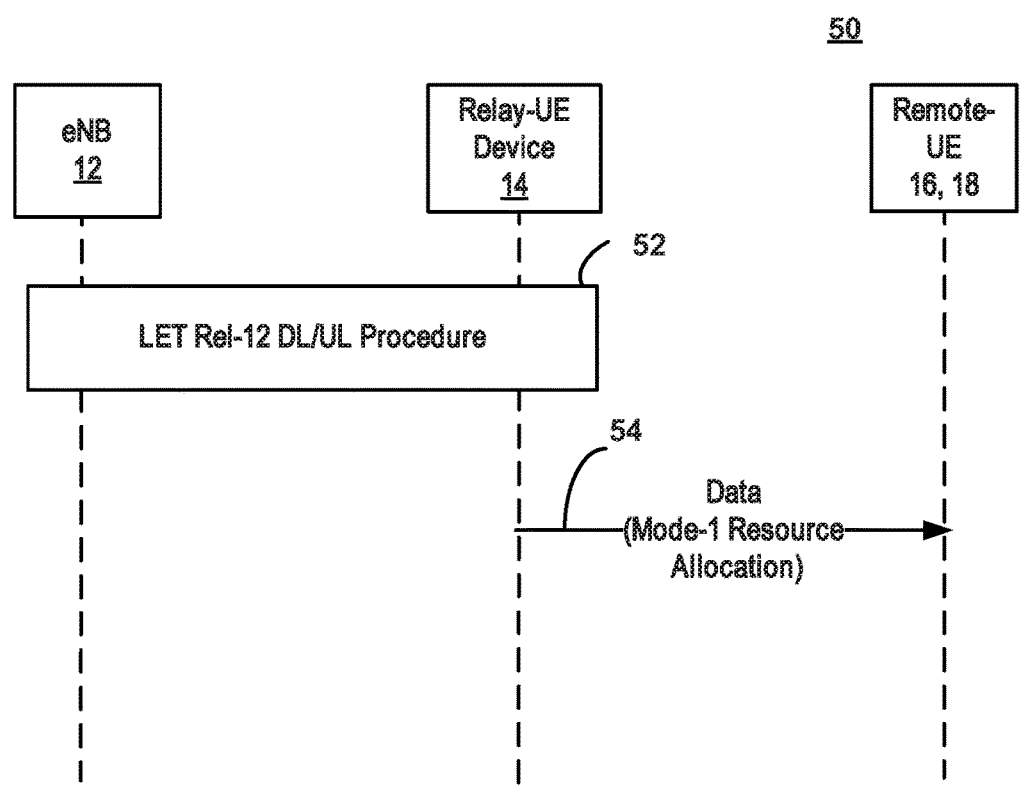
FIG. 3 is a transmission diagram depicting an example procedure of using allocated LTE Mode 1 DL transmission resources to send data to one of the remote UE devices included in the communication system of FIGS. 1-2.

The Relay-UE device 14 is located within the eNB coverage area 20, thus keeping the Relay-UE device 14 under the eNB/network control. Additionally, in order to maintain some compatible with LTE Rel-12, the LTE Rel-12 D2D procedures are employed for certain Relay-UE device 14 D2D transmissions. For example, LTE Rel-12 D2D communication Mode 1 resource allocations may be used for the Relay-UE device 14 transmissions towards the remote UE devices 16,18 (downstream transmissions). This approach is indifferent to whether the remote UE is the InC remote UE device 18 or OoC UE device 16. FIG. 3 presents the signaling and steps required for forwarding data from the eNB 12 to the remote InC or OoC UE devices 16, 18 via the Relay-UE device 14, with no changes to the existing Rel-12 D2D Mode 1 resource allocation.

FIG. 3 is a transmission diagram 50 depicting an example procedure of using allocated LTE Mode 1 DL transmission resources to send data to one of the remote UE devices 16, 18 included in the communication system 10. At event 52, a cellular communication link, including both downlink and uplink channels, is established between the eNB 12 and Relay-UE device 14 using LTE Rel-12 procedures. At transmission 54, the Relay-UE device 14 sends to the remote UE device 16 or 18 data using allocated Mode 1 communication resources for the D2D link between the Relay-UE device 14 and the remote UE device 16 or 18, thus using an LTE Rel-12 Mode 1 transmission.

Procedures for the upstream data path (e.g., data path 28, 42 of FIG. 2) for a remote UE-to-eNB data relay operation are now described. The procedures described herein reuse at least some of the existing LTE Rel-12 D2D procedures in order to achieve a manageable complexity.

Figure 4:
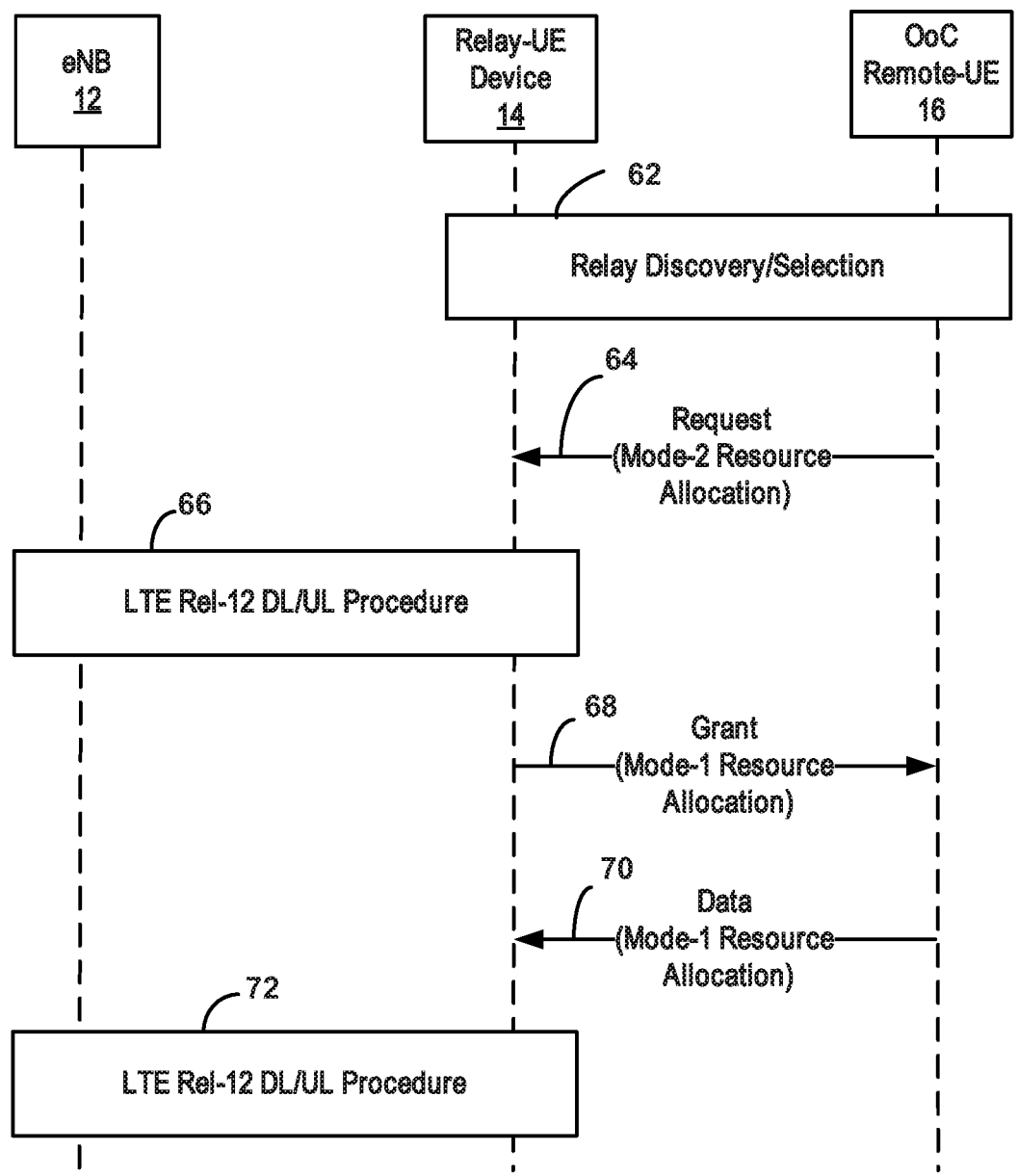
FIG. 4 is a transmission diagram depicting a first example procedure of relaying upstream data between the out-of-coverage UE device and eNB included in the communication system of FIGS. 1-2.

A first approach, depicted in FIG. 4, is to map the reception resources of the D2D link 28 between the Relay-UE device 14 and remote OoC UE device 16 to the uplink resources used for the Relay-UE device 16 to eNB 12 uplink 42.

FIG. 4 is a transmission diagram 60 depicting a first example procedure of relaying upstream data between the remote OoC UE device 16 and the eNB 12 included in the communication system 10, via the Relay-UE device 14. At event 62, relay discovery and selection is conducted between the OoC UE device 16 and the Relay-UE device using standard LTE Rel-12 procedures for doing so. At transmission 64, after the Remote-UE device is discovered and selected, the OoC UE device 16 sends a request for transmission resources to the Relay UE device 14. At event 66, a cellular communication link, including both downlink and uplink channels, is established between the eNB 12 and Relay-UE device 14 using LTE Rel-12 procedures.

At transmission 68, the Relay-UE device 14 sends a grant to the OoC UE device 16 identifying Mode 1 resources allocated to the OoC UE device 16 for uplink D2D data transmissions to the Relay-UE device 14. With this grant, the Relay-UE device 14 relays the Mode 1 resource allocation information to the OoC UE device 16, which information the Relay-UE device 14 received from the eNB 12 in event 66, after the OoC UE device 16 sent the request for resources for the upstream transmission. The grant identifies a set of communication resources authorized for transmission of D2D uplink signals from the OoC UE device 16.

At transmission 70, the OoC UE device 16 sends data to the Relay-UE device 14 using the allocated Mode 1 communication resources. At event 72, the Relay-UE device 16 relays the data from the OoC UE device to the eNB 12 using LTE Rel-12 standard UL procedures.

Figure 5:
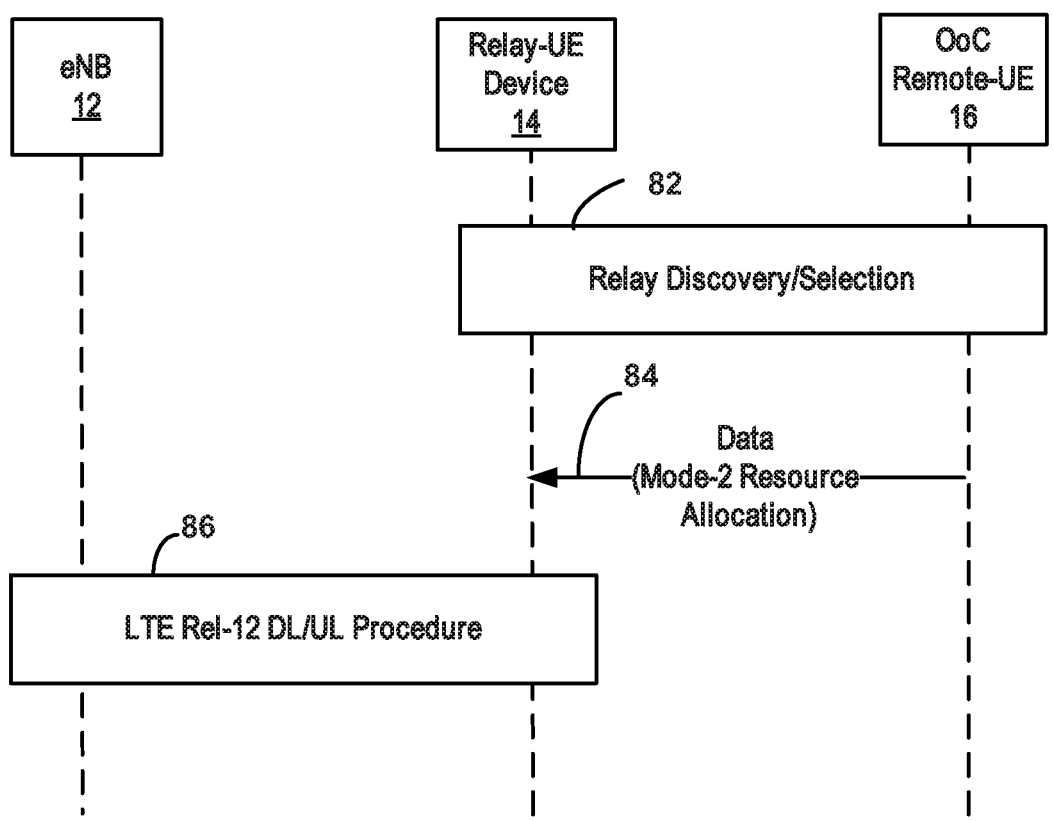
FIG. 5 is a transmission diagram depicting a second example procedure of relaying upstream data between the out-of-coverage UE device and eNB included in the communication system of FIGS. 1-2.

FIG. 5 is a transmission diagram 80 depicting a second example procedure of relaying upstream data between OoC UE device 16 and the eNB 12 included in the communication system 10, via the Relay-UE device 14. LTE Rel-12 specifies that an OoC UE device is to use Mode 2 resource allocations for its D2D transmissions. Thus, to reuse existing LTE procedures, the OoC UE device 16 may use LTE Rel-12 Mode 2 resources allocated for its upstream transmissions. In this scenario, the OoC UE device 16 uses a preconfigured resource pool dedicated to D2D communication links for its data transmissions. FIG. 5 shows the signaling and the steps for the forwarding upstream data from the remote OoC UE device 16 to the eNB 12 via the Relay-UE device 14.

The procedure shown in FIG. 5 has several advantages over procedure depicted in FIG. 4. As shown in the transmission diagram 80, the signaling between the Relay-UE device 14 and eNB 12 (event 66 of FIG. 4), which is needed to request the resources for Mode 1 communication depicted in diagram 60, is avoided, resulting in reduced signaling overhead and latency. Also, the standardization effort can be reduced since the existing LTE Rel-12 procedures can be reused to a certain extent.

Turning to FIG. 5, at event 82, relay discovery and selection is conducted between the OoC UE device 16 and the Relay-UE device 14 using standard LTE Rel-12 procedures for doing so. At transmission 84, the OoC UE device 16 sends data to the Relay-UE device 14 using the allocated Mode 2 communication resources. At event 86, the Relay-UE device 14 relays the data received from the OoC UE device 16 over the D2D link to the eNB 12 using LTE Rel-12 standard procedures.

However, the procedure depicted in FIG. 5 does not ensure there are no collisions from other OoC UE Mode 2 transmissions. In order to avoid collisions, communication resource selection is beneficial. The relay procedure shown in FIG. 6 overcomes the collision issue.

Figure 6:
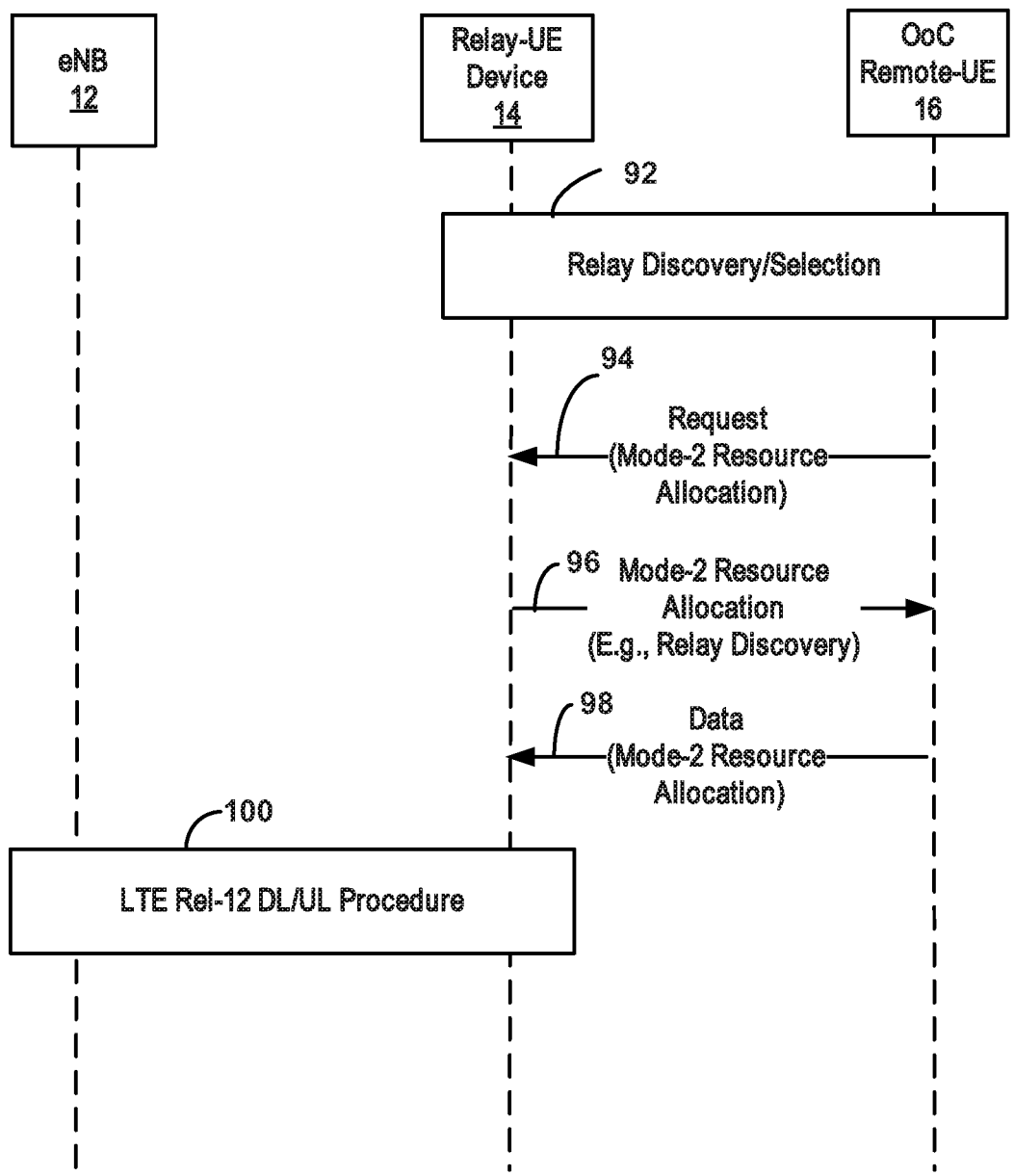
FIG. 6 is a transmission diagram depicting a third example procedure of relaying upstream data between the out-of-coverage UE device and eNB included in the communication system of FIGS. 1-2.

FIG. 6 is a transmission diagram 90 depicting a third example procedure of relaying upstream data between the OoC UE device 16 and the eNB 12 included in the communication system 10, via the Relay-UE device 14. At event 92, relay discovery and selection is conducted between the OoC UE device 16 and the Relay-UE device 14 using standard LTE Rel-12 procedures for doing so. At transmission 94, the OoC UE device 16 sends a request for transmission resources to the Relay-UE device 14. Alternatively and/or additionally, an initiation by the OoC UE device 16 to establish a Remote-UE group-to-Relay-UE Device link may also be a request for uplink transmission resources. The request signal transmitted by the OoC UE device 16 shown in FIG. 5 is merely an example.

At transmission 96, the Relay-UE device 14 sends an allocation of Mode 2 communication resources to the OoC UE device 16. The Relay-UE device 14 transmits the resource allocation, which may be used by the OoC UE device 16 or Remote-UE group for transmitting its data on the uplink path 28. The communication resources allocated to the OoC UE device 16 or Remote-UE group may belong to the LTE Rel-12 Mode 2 resource pool preconfigured for OoC UE devices (e.g., subset(s) of the Mode 2 resource pool).

To accomplish the transmission 96, the procedures of LTE Rel-12 may be modified in certain ways. This modification allows the Relay-UE device 14 to convey the resource allocation information to the OoC UE device 16 or Remote-UE group. There are several approaches to handle this task.

The first approach is for the Relay-UE device 14 to transmit the resource allocation using an LTE Rel-12 Mode 2 transmission. The second approach is for the Relay-UE to transmit the resource allocation information within a Physical Side Link Broadcast Channel (PSBCH) in accordance with the at least one revision of the 3GPP LTE communication specification. To do this, additional bits are included in PSBCH sidelink channel to convey the resource allocation information.

The third approach is for the Relay-UE device 14 to transmit the resource allocation information as part of a message carried by a relay-discovery Physical Sidelink Discovery Channel (PSDCH) signal. This information is filled in the relay-discovery message after a Remote-UE device or a Remote-UE group requests resources. Or the Relay-UE device broadcasts this information after it volunteers to be the Relay-UE or is assigned that role by the eNB 12. The relay-discovery signal can be broadcast by the Relay-UE device 14 and received by the near-by OoC UE devices 16 that may also benefit from this information. For example, one benefit would be to use the relay-discovery message to avoid transmitting data on the same Mode 2 resources, and thus, avoid collisions. The relay-discovery signal may be transmitted using the LTE Rel-12 discovery resource pool. Alternatively, a separate relay-discovery signal resource pool may be provided, which may be monitored by all UE devices. A separate relay-discovery signal resource pool may allow an appropriate transmission periodicity to prevent undesired latency.

At transmission 98, the OoC UE device 16 sends data to the Relay-UE device using the allocated Mode 2 communication resources. At event 100, the Relay-UE device 14 relays the data from the OoC UE device 16 to the eNB 12 using LTE Rel-12 procedures.

The third example procedure has several advantages. For example, the Relay-UE device does not need to first request resources from the eNB 12 because these resources do not belong to Mode 1 resource pool. This avoids signaling overhead and additional latency.

Figure 7:
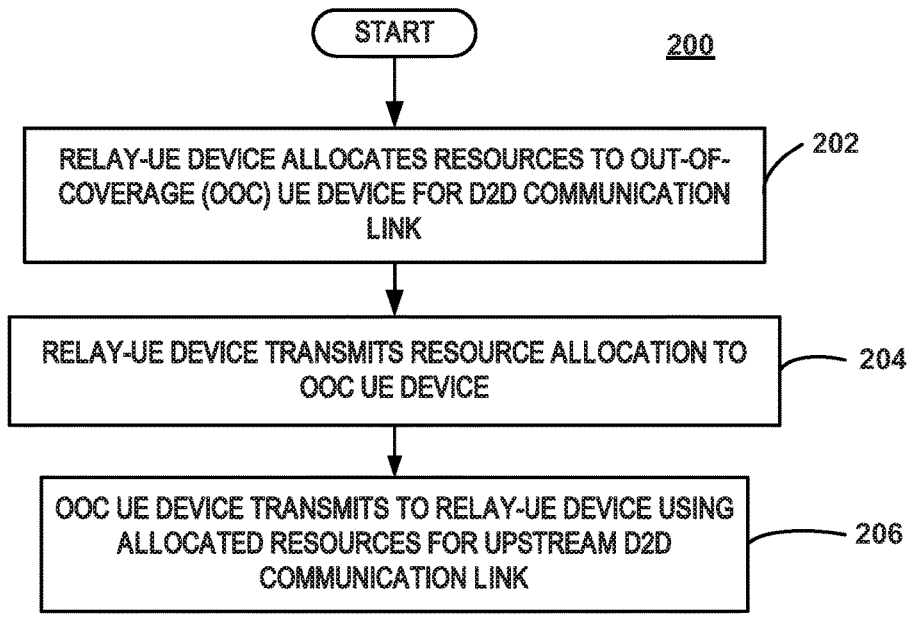
FIG. 7 is a flowchart of an example of a method of selecting communication resources for a device-to-device (D2D) communication link between the Relay UE device and out-of-coverage UE included in the communication system of FIGS. 1-2.

FIG. 7 is a flowchart of an example of a method 200 of selecting communication resources for the D2D communication link 22 between the Relay-UE device 14 and the OoC UE device 16 included in the communication system 10. In box 202, the Relay-UE device 14 allocates communication resources to the OoC UE device 16 for uplink transmissions on the D2D communication link 22 between the Relay-UE device 14 and the OoC UE device 16. The Relay-UE device 14 may independently determine the selected resources by allocating subset(s) of the preconfigured LTE resource pools to the remote OoC UE device 16. For example, the Relay-UE device 14 may select one or more Mode 2 transmission resources from the LTE Rel-12 Mode 2 resource pool to allocate to the D2D communication link. In other words, the allocated resources may be selected from the LTE Mode 2 resource pool that is preconfigured for D2D communications between one or more OoC UE devices 16. Alternatively/additionally, the eNB 12 can direct the Relay-UE device 14 to choose specific resources from the resource pool.

In box 204, the Relay-UE device 14 then transmits the selected resource allocation to the OoC UE device 16. In box 206, the OoC UE device 16 may then transmit data to the Relay-UE device 14 using the allocated communication resources for the upstream D2D link 28.

Figure 8:
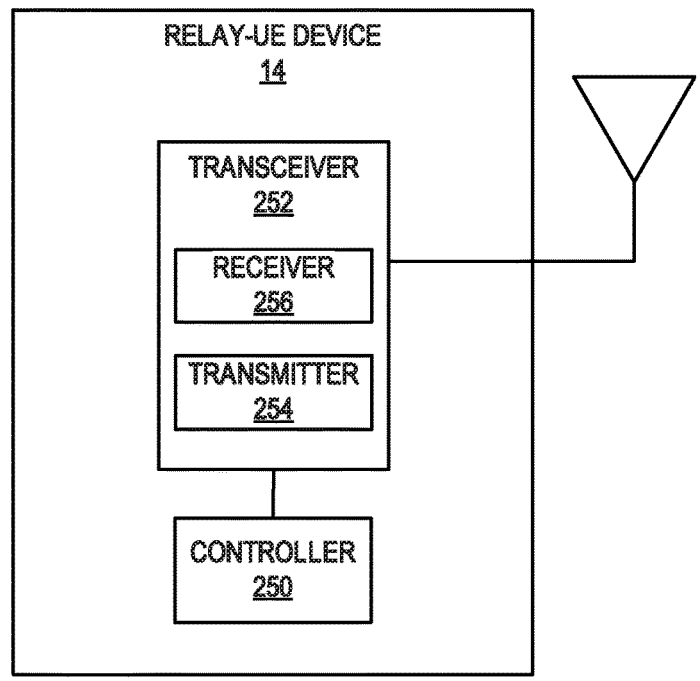
FIG. 8 is a detailed block diagram showing certain components of the Relay-UE device.

FIG. 8 is a block diagram showing certain components of the Relay-UE device 14. The Relay-UE device 14 is also suitable for use as the UE devices 16, 18. The UE device 14 includes a transceiver 252, a controller 250, as well as other components and circuitry (not shown) such as memory, for example. The transceiver 252 includes a transmitter 254 and a receiver 256. The transceiver 252 transmits uplink wireless signals to base stations and receives downlink wireless signals from the base stations. The transceiver 252 can also be configured to transmit and receive D2D signals using allocated communication resources.

The controller 250 controls components of the UE device 14 to manage the functions of the device described herein, as well as to facilitate the overall functionality of the device 14. The controller 250 is connected to the transceiver 252 and other components such as memory (not shown). The controller 250 may be a programmable device, such as a processor or other logic device, which executes software/firm stored in a memory. In such an arrangement, the software/firmware may configure the controller 250 to cause the Relay-UE device 14 to perform the communication resource allocation, resource notification, and data relay functions disclosed herein, among other things.

In scenarios where the remote UE device is an InC UE device, such as InC UE device 18 shown in FIGS. 1 and 2, the remote UE device may use the LTE Rel-12 Mode 1 communication resource pool for its upstream data transmissions in a D2D communication link to a Relay-UE device, such as link 24.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method, comprising:
receiving, from a base station at an in-coverage user equipment (UE) device configured to act as a relay user equipment (Relay-UE), a resource allocation from a resource pool, the resource allocation for a device-to-device (D2D) communication link between an out-of-coverage UE device and the in-coverage UE device, the resource allocation having been selected by the base station without having a resource request transmitted by the out-of-coverage UE device; and
transmitting, via a D2D broadcast transmission from the in-coverage UE device to the out-of-coverage UE device, the resource allocation selected by the base station.

2. The method of claim 1, further comprising:
allocating, by the in-coverage UE device, one or more Mode-2 transmission resources from the resource pool to the D2D communication link.

3. The method of claim 1, wherein the resource allocation is selected from a Mode-2 resource pool that is preconfigured for communications with one or more out-of-coverage UE devices.

4. The method of claim 1, wherein the in-coverage UE device transmits the resource allocation by way of a Physical Sidelink Broadcast Channel (PSBCH).

5. The method of claim 1, wherein the in-coverage UE device transmits the resource allocation as part of a message carried by a relay-discovery Physical Sidelink Discovery Channel (PSDCH) signal.

6. The method of claim 1, further comprising:
establishing a remote user equipment group (Remote-UE group) including the out-of-coverage UE device.

7. The method of claim 1, wherein the resource allocation is selected from a resource pool for communications between a Remote-UE group and a Relay-UE.

8. The method of claim 1, wherein the D2D broadcast transmission comprises a Mode 1 transmission.

9. The method of claim 1, wherein the D2D broadcast transmission comprises a D2D control information transmission.

10. A cellular communication system, comprising:
an in-coverage relay user equipment (Relay-UE) device configured to receive, from a base station, a resource allocation from a resource pool and to transmit, via a device-to-device (D2D) broadcast transmission, the resource allocation as part of a message included in a transmitted relay-discovery Physical Sidelink Discovery Channel (PSDCH) signal; and
an out-of-coverage user equipment (UE) device configured to receive the resource allocation transmitted from the Relay-UE device;
wherein the resource allocation is for a device-to-device (D2D) communication link between the in-coverage Relay-UE device and the out-of-coverage UE device, the resource allocation having been selected by the base station without having a resource request transmitted by the out-of-coverage UE device.

11. The system of claim 10, wherein the in-coverage Relay-UE device is configured to allocate one or more Mode-2 transmission resources from the resource pool to the D2D communication link.

12. The system of claim 10, wherein the resource allocation is associated with a Mode-2 resource pool that is preconfigured for communications with one or more out-of-coverage UE devices.

13. The system of claim 10, further comprising:
a base station configured to provide services in a coverage area encompassing the in-coverage Relay-UE.

14. The system of claim 10, further comprising:
a remote user equipment group (Remote-UE group) including the out-of-coverage UE device.

15. The cellular communication system of claim 10, wherein the D2D broadcast transmission comprises a Mode 1 transmission.

16. The cellular communication system of claim 10, wherein the D2D broadcast transmission comprises a D2D control information transmission.

17. A user equipment (UE) device configured to act as a relay user equipment (Relay-UE), comprising:
a receiver configured to receive, from a base station, a resource allocation from a resource pool, the resource allocation for a device-to-device (D2D) communication link between the UE device and an out-of-coverage UE device, the resource allocation having been selected by the base station without having a resource request transmitted by the out-of-coverage UE device; and
a transmitter configured to transmit, via a D2D broadcast transmission to the out-of-coverage UE device, the resource allocation as part of a message included in a transmitted relay-discovery Physical Sidelink Discovery Channel (PSDCH) signal.

18. The device of claim 17, wherein the resource allocation is selected from a Mode-2 resource pool that is preconfigured for communications with one or more out-of-coverage UE devices.

19. The UE device of claim 17, wherein the D2D broadcast transmission comprises a Mode 1 transmission.

20. The UE device of claim 17, wherein the D2D broadcast transmission comprises a D2D control information transmission.

* * * * *